United States Patent
Kanno

[15] 3,671,837
[45] June 20, 1972

[54] ROTATION CONTROL CIRCUIT FOR TRANSISTOR MOTOR

[72] Inventor: Satoshi Kanno, Yamato, Japan
[73] Assignee: Victor Company of Japan Ltd., Yokohama Kanagawa-ku, Japan
[22] Filed: Oct. 20, 1970
[21] Appl. No.: 82,295

[30] Foreign Application Priority Data

Oct. 20, 1969 Japan..................................44/83240

[52] U.S. Cl............................................................318/394
[51] Int. Cl..........................................................H02p 7/28
[58] Field of Search..................318/394, 356, 345, 331, 138

[56] References Cited

UNITED STATES PATENTS

| | | | |
|---|---|---|---|
| 3,504,252 | 3/1970 | Moczala et al. | 318/138 |
| 3,452,262 | 6/1969 | Moczala et al. | 318/138 |
| 3,396,323 | 8/1968 | Auld | 318/345 X |

Primary Examiner—Bernard A. Gilheany
Assistant Examiner—W. E. Duncanson, Jr.
Attorney—Holman & Stern

[57] ABSTRACT

The rotation control circuit comprises a driving circuit performing a switching action to sequentially flow a current to stator windings of a transistor motor and a control switching circuit performing a switching action by a control signal responsive to the rotation speed of a rotor. The control switching circuit acts to perform a current control at the starting time of rotation of the motor and to perform a voltage-current control at the time of constant rotation of the motor.

5 Claims, 5 Drawing Figures

Fig. 1

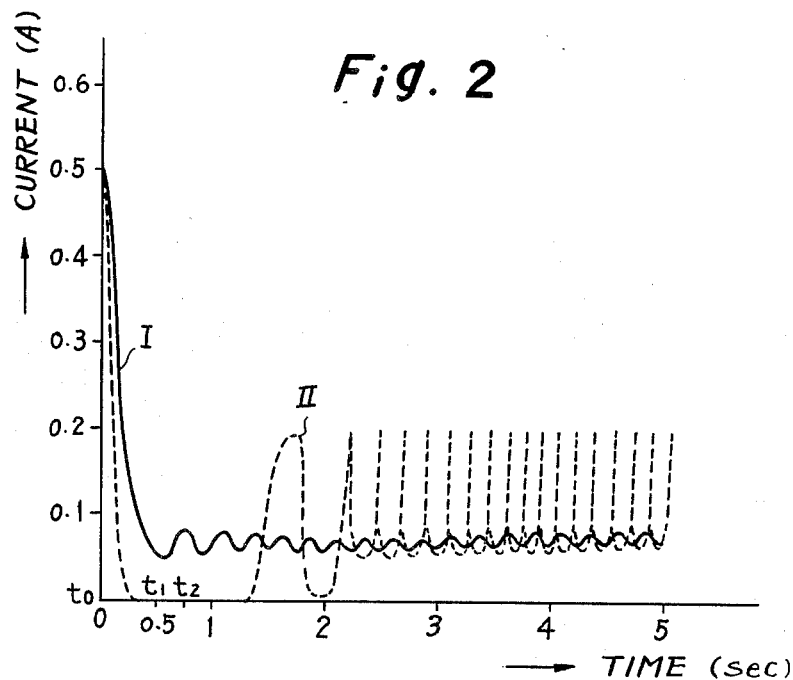
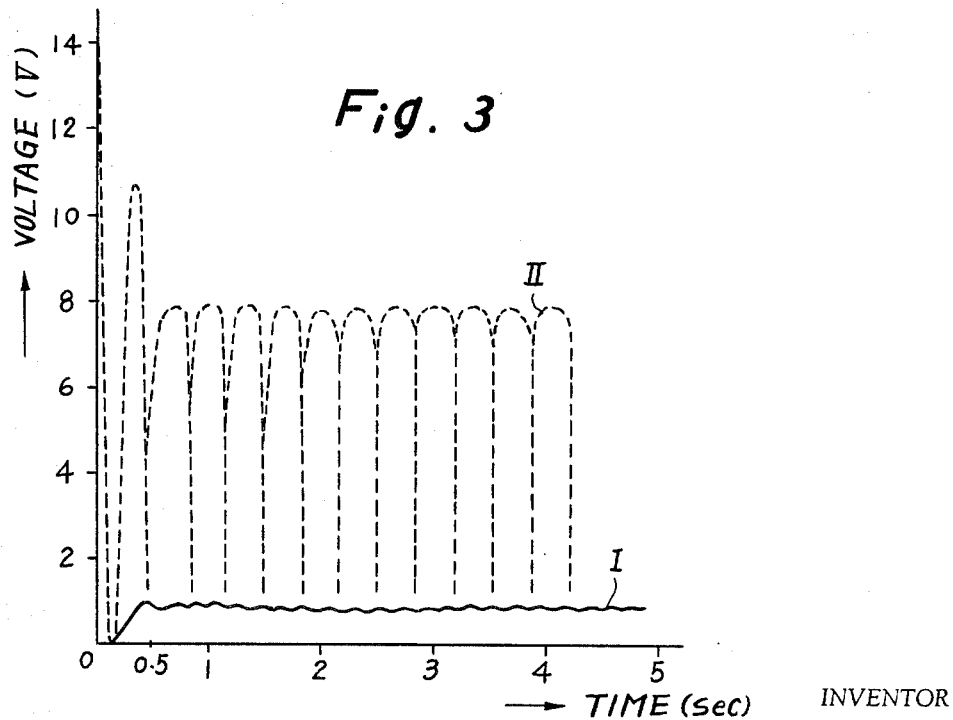

3,671,837

ROTATION CONTROL CIRCUIT FOR TRANSISTOR MOTOR

This invention relates to a rotation control circuit for a transistor motor, and more particularly to a circuit for automatically switching the rotation control systems in response to the rotation speed of a rotor of a motor.

A DC motor having a transistor circuit for commutation purpose but no brushes nor commutator has heretofore appeared as a transistor motor. For circuits for controlling the rotation of the transistor motor, there have been a conventional circuit employing a switching rotation control system (hereafter called as a "current control circuit") and a circuit using an amplifying rotation control system (hereafter called as a "voltage control circuit"). The current control circuit uses an error voltage obtained by comparison of a signal output proportional to the rotation of the rotor of the transistor motor with a reference standard voltage and switches a switching transistor provided in a circuit for supplying a current to the motor by the error voltage. The voltage control circuit controls the transistor in the current supply circuit by the above described error voltage and continuously increases or decreases the current supplied to the motor. All these conventional circuits however have had the following disadvantages.

In the conventional current control circuit, there frequently occurs the overshoot of rotation when the motor is started. Therefore, much time is required until the rotation is stabilized. The phenomenon is quite prominent in case that the weight of the rotor is large and the load of the flywheel driven by the rotor is extremely great. All supply current to the motor is supplied or interrupted by the switching action of the switching transistor in the rotation control circuit which acts after the motor has attained a normal rotation speed so that the rotor is imparted large impulsive drive forces and generates a great vibration in rotation control of the rotor. This appears most remarkably when a motor having specifically large torque is driven under a small load. Additionally, the load variations often cause changes in the rotation and in consequence produce flutters in the rotation.

In the conventional voltage control circuit, there appears an equivalent current limiting element in the circuit for supplying a current to the motor. The starting current of the motor is limited by the element and the starting characteristics of the motor is thereby worsened. Moreover, there must be used a transistor of high cost and large capacitance as a control transistor and this requires higher cost. The presence of the above described current limiting element further aggravates a response characteristic.

It is a general object of the present invention to provide a novel and useful rotation control circuit for a transistor motor which overcome the conventional disadvantages as hereinabove described.

Another object of the invention is to provide a rotation control circuit for a transistor motor which can automatically change the control system between the current control and the voltage control of the motor in response to the rotation speed of the motor.

A further object of the invention is to provide a rotation control circuit for a transistor motor which can perform the current control at the starting time of the motor and the current and voltage control at the time of rated and normal rotation of the motor. In consequence, the transistor motor generates a full torque at its starting time. Therefore, the motor can smoothly rise up its starting and is rapidly stabilized in a short period of starting without causing overshoot in rotation. Despite the variation of load during the normal rotation, the rotation is not affected by the variation. Furthermore, the vibration in rotation control is extremely small.

These and other objects and features of the present invention will become apparent from the following description when read in conjunction with the accompanying drawings, in which:

FIG. 1 is a circuit diagram of an embodiment of a rotation control circuit for a transistor motor according to this invention;

FIG. 2 is a diagram showing characteristics of a current in a stator winding in the circuit of this invention and also in the conventional circuit;

FIG. 3 is a diagram showing characteristics of a voltage on a stator winding in the circuit of this invention and also in the conventional circuit;

Figure 1:
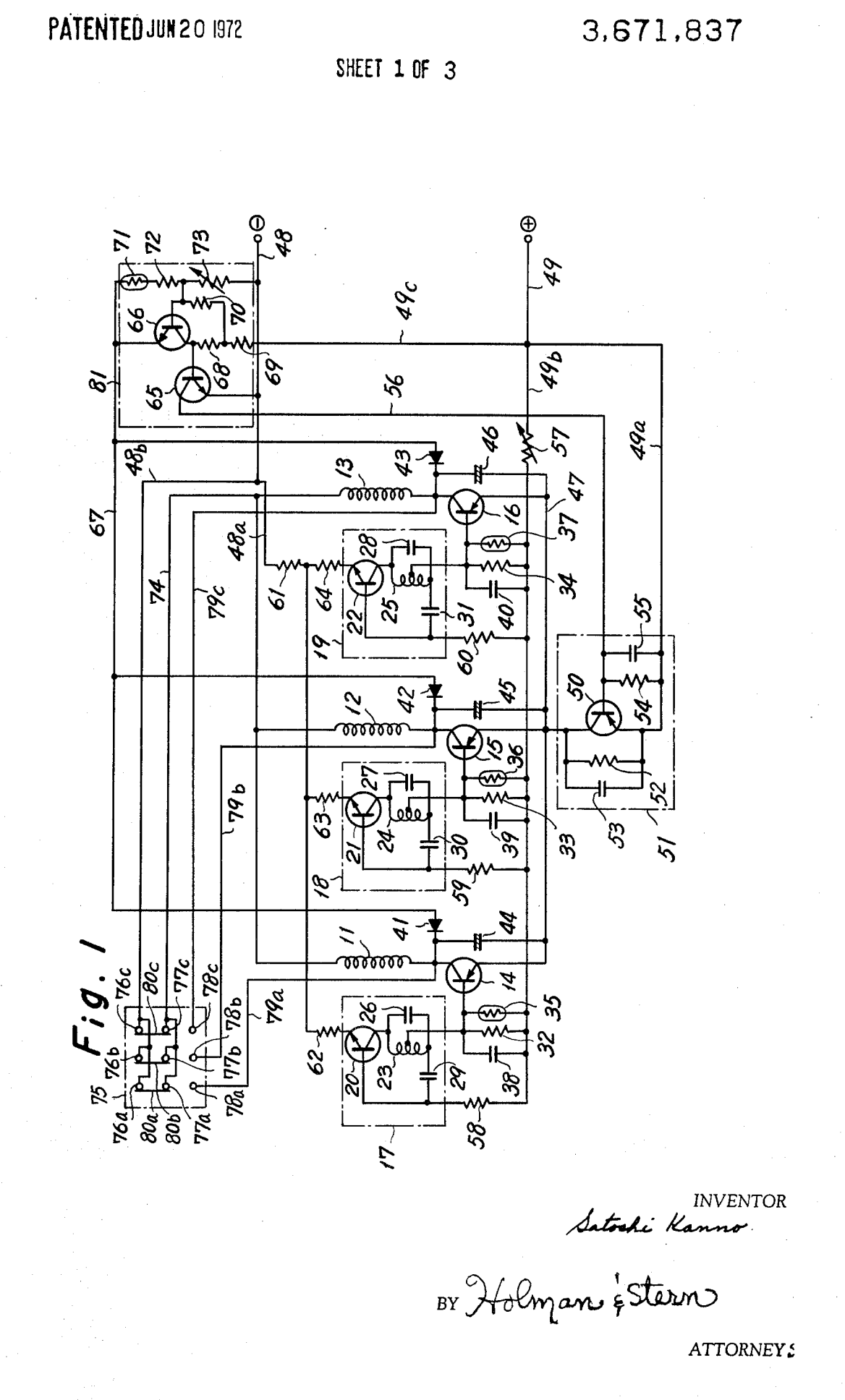
Figure 4:
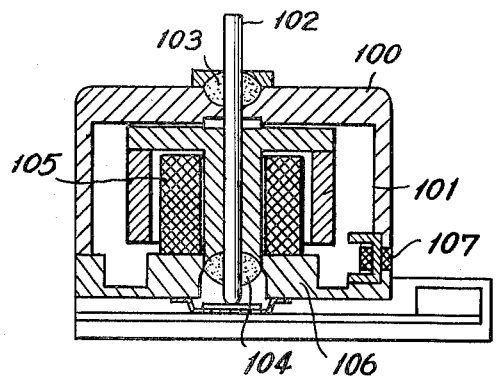
FIG. 4 is a vertical cross section of an embodiment of a DC brushless transistor motor to which the circuit of this invention can be applied.

Now, FIG. 1 shows a circuit diagram of an embodiment of a rotation control circuit for a transistor motor according to the present invention. Stator windings 11, 12 and 13 are respectively connected to the collectors of transistors 14, 15 and 16. Rotor position detecting circuits 17, 18 and 19 are connected between the bases of the respective transistors 14, 15 and 16 and a minus line 48 of a power source. The detecting circuits 17, 18 and 19, according to this embodiment, respectively form near-by switch type detecting circuits using oscillator circuits including respectively transistors 20, 21 and 22, detecting coils 23, 24 and 25, capacitors 26, 27 and 28 and capacitors 29, 30 and 31. The rotor position detecting circuits may otherwise employ circuits for detecting the position of the rotor in use of the HAll effect, circuits for detecting the position of the rotor through light and darkness of light flux and the like circuits.

Responsive to the positions of the rotor which are detected by the detecting circuits 17, 18 and 19, base bias resistors 32, 33 and 34 of the transistors 14, 15 and 16 are successively induced voltages. In consequence, the transistors 14, 15 and 16 successively perform switching actions. A current flows successively in the windings 11, 12 and 13 which form a rotary magnetic field. The rotary magnetic field rotates the rotor of cylindrical permanent magnet. Thermistors 35, 36 and 37 for thermal compensation and capacitors 38, 39 and 40 are connected respectively in parallel to the bias resistors 32, 33 and 34.

Diodes 41, 42 and 43 are respectively connected between the collectors of the transistors 14, 15 and 16 and a rotation speed comparing and detecting circuit 81. The diodes 41, 42 and 43 are connected in backward to a flowing direction of the collector currents of the transistors 14, 15 and 16. The capacitors 44, 45 and 46 are respectively connected between the collectors and emitters of the transistors 14, 15 and 16. The emitters of the transistors 14, 15 and 16 are connected to each other through a common connection line 47.

A control switching circuit 51 including a transistor 50 is connected between the common connection line 47 and a line 49a diverged from a plus line 49 of the power source. The collector of the transistor 50 is connected to the line 47 and the emitter of the transistor 50 is connected to the line 49a. Accordingly, the transistor 50 and the respective transistor 14, 15 and 16 are connected in series. Also, a resistor 52 and a capacitor 53 are connected in parallel between the collector and the emitter of the transistor 50. A resistor 54 and a capacitor 55 are connected in parallel between the emitter and the base of the transistor 50. The base of the transistor 50 is connected with a line 56 derived from the rotation speed comparing and detecting circuit 81.

On a line 49b diverged from the plus line 49, a variable resistor 57 is connected in series with the resistors 32, 33 and 34. The variable resistor 57 is adjusted to be set up at a resistance value so that the circuit performs a desired control operation as later described. Resistors 58, 59 and 60 are respectively connected between the line 49b and the bases of the transistors 20, 21 and 22 of the rotor position detecting circuits 17, 18 and 19. A resistor 61 is inserted into a line 48a diverged from the minus line 48. Resistors 62, 63 and 64 are respectively connected between the resistor 61 and the emitters of the transistors 20, 21 and 22.

The rotation speed comparing and detecting circuit 81 includes a transistor 65 which has the collector connected to the line 56 and the emitter connected to the line 48 and a transistor 66 which has the emitter connected to a common connection line 67 of the diodes 41, 42 and 43 and the collector connected to the base of the transistor 65. The collector of the transistor 66 is further connected to a line 49c diverged from the plus line 49 through the resistors 68 and 69. A resistor 70 is connected between the base of the transistor 66 and a connecting point of the resistors 68 and 69. A thermal compensation thermistor 71 and a resistor 72 are connected between the base of the transistor 66 and the line 67. A variable resistor 73 is connected between the base of the transistor 66 and the minus line 48.

The diverged line 48b and a common connection line 74 of stator windings 11, 12 and 13 have respectively contacts 76a, 76b and 76c and contacts 77a, 77b and 77c in a quick switch 75. Lines 79a, 79b and 79c led from a connecting point of the collectors of the transistors 14, 15 and 16 and the stator windings 11, 12 and 13 have respectively contacts 78a, 78b and 78c in the switch 75.

Operation of the circuit described above is now illustrated. At the starting of the motor, a power source switch (not shown) is closed and a DC voltage $E_0$ is applied between the lines 48 and 49. Contact members 80a, 80b and 80c of the switch 75 are respectively connected to the contacts 76a, 77a, 76b, 77b, 76c and 77c. At this instant, the transistor 66 is in a cut-off state and the transistor 65 is in a conductive state. Accordingly, a current flows through a path including the plus line 49 –line 49a –resistor 54 –line 56 –transistor 65 –minus line 48. By voltage drop on the resistor 54, the transistor 50 is applied a base bias and the transistor 50 becomes to be in a conductive state.

As the transistor 50 becomes conductive, the voltage difference $E_2$ between the lines 47 and 49a is nearly at zero. The base of either one of the transistors 20, 21 or 22, for example, of the transistor 20 is applied a sufficiently large forward voltage $E_1$ and the transistor 20 becomes conductive in this case. A current flows through a path including the line 49a – transistor 50 – line 47– transistor 14 – stator winding 11 –line 74– switch 75 – lines 48b and 48. Consequently the current flows through the winding 11. The current is, for example, about 0.5A at the time $t_0$ as shown by a full line I in FIG. 2. Then, the voltage is nearly equal to the power source voltage which is about 14V as shown by a full line I in FIG. 3.

When the rotor starts its rotation by the current in the stator winding 11, the rotor position detecting circuit 17 becomes inoperative and the transistor 14 becomes to be in a cut-off state. Following this, the rotor position detecting circuit 18 detects the rotor position and operates. The transistor 15 is then changed from the cut-off state to the conductive state. Then, the current flows through the stator winding 12 and the rotor is driven. In the similar manner, the transistors 11, 12 and 13 are switched to conductive in succession. The rotor starts its rotation to rapidly attain a normal rotation speed. At this instant, a large current flows through the windings 11, 12 and 13 so that the starting torque of the motor is large and the motor is exerted with a full torque. The starting operation of the motor at this instant is similar to the operation performed by the so-called current control system.

With increasing of rotation speed of the rotor, there is generated a counter electromotive voltage $E_3$ in the windings 11, 12 and 13 by rotation of the rotor. Herein, if the constant determined by the number of turns of coils of the stator winding, strength of the permanent magnet of the rotor and the reluctance is provided as K, and the rotation number per unit time of the rotor as N, the counter voltage $E_3$ is expressed by the formula, $E_3 = -KN$. Thus, the minus counter voltage $E_3$ is proportioned to the rotation number $N$ of the rotor so that the current flowing through the stator winding is decreased as shown by the full line I in FIG. 2 in response to the increasing of the rotation speed of the rotor.

The counter voltage induced in the windings 11, 12 and 13 is applied on the emitter of the transistor 66 of the rotation speed comparing and detecting circuit 81 through the diodes 41, 42 and 43. Thereby, the voltage of the emitter of the transistor 66 is dropped by increased rotation speed of the motor. The base voltage of the transistor 66 can be preferably variably set up by adjustment of the variable resistor 73. The standard rotation speed as a reference for the control of the rotation speed of the motor can be set up by a setting of the base voltage of the transistor 66 according to the control of the variable resistor 73. When the rotation speed of the rotor increases exceeding the normal rotation speed and the emitter voltage of the transistor 66 which is applied the counter voltage exceeds a predetermined voltage preset by the variable resistor 73, then the transistor 66 becomes conductive. At the same time, the transistor 65 becomes to be in a cut-off state and the current in the line 56 is cut off.

Therefore, the capacitor 55 discharges a current through the resistor 54 and transistor 50. Following the discharge of the capacitor 55, the base voltage of the transistor 50 drops and eventually the transistor 50 becomes cut-off state. By cutting-off of the transistor 50, a current flows through a path including the line 49a –capacitor 53 – transistor 14, 15 or 16 – stator winding 11, 12 or 13 – line 74 – switch 75 – lines 48b and 48. Consequently the current flows through the capacitor 53. By similar path a current flows through the resistor 52 to the stator winding 11, 12 or 13. Even if the transistor 50 becomes cut-off state, the current flows in the stator windings 11, 12 and 13 without being cut off. Therefore, the rotor will not be greatly affected by change of impulsive drive force due to switching action of the transistor 50. The current flowing through the stator winding when the transistor 50 becomes cut-off state is shown by the full line I at a time $t_1$ in FIG. 2.

After cutting off of the transistor 50, the voltage different $E_2$ between the lines 49a and 47 increases in response to charging of the capacitor 53. On the other hand, the voltage difference $E_1$ between terminals of the resistors 57 and 32(or 33, 34) is constant. Accordingly, the voltage difference $(E_1-E_2)$ between the bases and the emitters of the transistors 14, 15 and 16 decreases. Thereby, the collector currents of the transistors 14, 15 and 16 are decreased. Also, the currents flowing through the windings 11, 12 and 13 are decreased. In this way, the base bias voltages of the transistors 14, 15 and 16 are dropped and the transistors 14, 15 and 16 act mere DC amplifying operations (voltage control). Thus, after rotation speed of the rotor reaches to a predetermined speed, the control system of the motor is automatically and smoothly switched over from the current control system to the voltage-current control system.

The rotation speed of the rotor driven by the stator windings 11, 12 and 13 through which a reduced current flows from a circuit including the resistor 52 is gradually lowered. The counter voltage which is generated in the windings 11, 12 and 13 and applied to the rotation speed comparing and detecting circuit 81 is also gradually lowered. If the rotation speed of the rotor is lowered more than the predetermined speed, the emitter-base voltage of the transistor 66 is lowered less than 0.65V and the transistor 66 becomes cut-off state. Then, the transistor 65 becomes conductive and the current again flows through the path as described in the operation at the starting time to the line 56. The transistor 50 is thus in the conductive state.

By conductance of the transistor 50, the rotation speed of the rotor again increases by the same action as described above. In the similar way, the transistor 50 turns to conductive or cut-off states when the rotation speed of the rotor increases over the predetermined rotation speed or decreases below the same so that the rotation speed of the rotor will always be as predetermined speed. By repetition of on and off (conducting and cutting-off) actions of the transistor 50, the current control system is automatically switched over to the voltage-current control system and vice versa.

In order to stop the motor quickly, the contact members 80a, 80b and 80c of the switch 75 are switched over to connect to the contacts 77a, 78a, 77b, 78b, 77c and 78c. Consequently, the stator windings 11, 12 and 13 are short circuited and a current does not flow. Being braked of its rotation by a load of the motor(for example, a turn table in case that the motor is used as a phonomotor), the motor quickly stops its rotation.

Constants of elements in the circuit shown in FIG. 1 are as follows.

| | | |
|---|---|---|
| RESISTOR | 32 | 150Ω |
| | 33 | 150Ω |
| | 34 | 150Ω |
| | 52 | 470Ω |
| | 54 | 5KΩ |
| | 57 | 120Ω (Variable) |
| | 58 | 33KΩ |
| | 59 | 3333KΩ |
| | 60 | 33KΩ |
| | 61 | 120Ω |
| | 62 | 150Ω |
| | 63 | 150Ω |
| | 64 | 150Ω |
| CAPACITOR | 26 | 0.001F |
| | 27 | 0.001F |
| | 28 | 0.001F |
| | 29 | 0.002F |
| | 30 | 0.002F |
| | 31 | 0.002F |
| | 38 | 0.1F |
| | 39 | 0.1F |
| | 40 | 0.1F |
| | 44 | 5μF |
| | 45 | 5μF |
| | 46 | 5μF |
| | 53 | 4μF |
| | 55 | 100μF |

Nemerical instances of the respective voltages in the above embodiment are as follows.

| Voltage | Starting of rotation | | Normal rotation | |
|---|---|---|---|---|
| | $E_0$ | 14V | $E_0$ | 14 |
| | $E_1$ | 0.2V | $E_1$ | 0.8V |
| | $E_2$ | 1.0V | $E_2$ | 1.0V |

In the circuit of this invention, the current flowing through the stator winding is, as shown by the full line I in FIG. 2, sufficiently large same as in the conventional current control system at the starting time of motor. After the motor has reached the normal rotation, the current flows with variation of small amplitude and continuously through the stator windings. As compared with this, the stator winding current in the conventional control system is shown by a broken line II in FIG. 2. According to the conventional system, as may be apparent from the same figure, the current is at zero after starting of the motor, flows again after a little time and then flows with extremely large variation.

In the circuit according to this invention, the voltage applied to the stator winding is nearly constant having no great variation as shown by the full line I in FIG. 3. However, in the conventional system, the voltage has large variation as shown by a broken line II in the same figure.

According to the circuit of this invention, the transient phenomenon being accompanyed by the switching action of the transistor 50 is very small in the normal rotation of the motor. Customarily, the variation in rotation relative to the variation of load of the motor has been 2 percent for example, but in this invention it has been improved to 0.5 percent. Therefore, the starting time of the motor is short and it smoothly rises up without overshoot. It is very quick to stabilize in the normal rotation. Thus, the building-up time is made shorter about one half to one quarter times as compared with that of the conventional motors. In the conventional circuit, for example, under a load of a turn table of 900 gram, it is noted that the building-up time is 3.5 to 4 seconds, while it is 0.5 to 0.7 seconds in the circuit of this invention. Moreover, since the rotation variation is very small as described, above, the rotation control vibration is extremely small. When the motor is applied to a phonomotor, for example, it can have its S/N much improved by 5 – 10dB.

Figure 5:
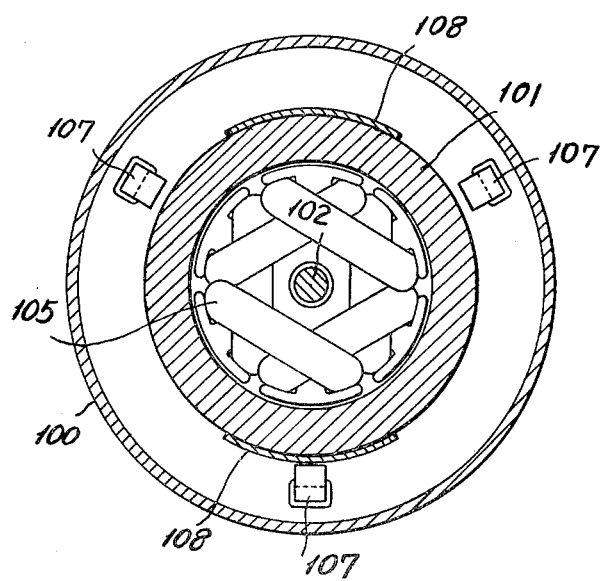
FIG. 5 is a transversely sectioned plan view of the motor shown in FIG. 4.

FIGS. 4 and 5 shown an embodiment of a DC brushless transistor motor to which the circuit according to this invention can been applied. A rotary shaft 102 is inserted through the middle of a casing 100. A rotor 101 is fixedly mounted on the shaft 102 which is carried by bearings 103 and 104. The rotor 101 consists of hollow and cylindrical permanent magnet having two poles. A three-phase stator windings 105 corresponding to the stator windings 11, 12 and 13 of FIG. 1 are fixedly provided on a base plate 106 of the casing 100 and inserted into the hollow inner part of the rotor 101. As the rotor 101 rotates outside the stator windings 105, it is called as an outer rotor. There are three detecting coils 107 equivalent to the detecting coils 23, 24 and 25 of FIG. 1, which are provided at positions with intervals of 120° and adjacent to the rotor 101 on the casing 100. Outside the rotor 101, there are provided two iron pieces 108 with an interval of 180°. The iron piece 108 has a width of 60° and cooperates with the detecting coil 107 for the detection of the rotation position of the rotor 101. When the iron piece 108 comes close to the detecting coil 107, the factor Q of the coil is lowered. At this instant, oscillations of the oscillating circuits of the detecting circuits 17, 18 and 19 shown in FIG. 1 are quickly stopped. And the load impedance becomes substantially to be a resistance component, and a voltage is generated, and thereby the position of the rotor is detected. The oscillating frequency of the oscillating circuit is, for example 350KHz in this embodiment.

The circuit according to the present invention can be applied to an inner rotor type motor in which the rotor rotates inside the stator windings as well as to the above described outer rotor type motor.

What I claim is:

1. A rotation control circuit for a transistor motor including a rotor, a stator having a plurality of stator windings, transistors defining a driving circuit connected in series with the stator windings respectively, and means for switching the transistors on and off in time sequence: said rotation control circuit comprising;

means for forming a control signal responsive to the rotation speed of the rotor; and a control switching circuit means which comprises a transistor having the control signal applied to its base and performing a switching action, a resistor and a capacitor connected between the base and the emitter of the transistor, said collector of said transistor being connected to the emitter of the transistor of the driving circuit, said control switching circuit means controlling the base bias of the transistor of the driving circuit, applying a maximum voltage to the driving circuit at the starting time of rotation of the rotor, and performing a switching action and controlling the voltage applied on the driving circuit at the time of normal rotation of the rotor.

2. The rotation control circuit of claim 1, which further comprises resistors respectively connected to the bases of the transistors of the driving circuit; a variable resistor connected in series to the each of the resistors; and a power source having a plus side and a minus side;

said variable resistor and the emitter of the transistor of said control switching circuit being connected to the plus side of the power source, and said stator windings being connected between the collectors of the transistors of the driving circuit and the minus side of the power source.

3. A rotation control circuit for a transistor motor including a rotor, a stator having a plurality of stator windings, transistors connected in series with the stator windings respectively, and means for switching the transistors on and off in time sequence;

said rotation control circuit comprising;

a switching transistor connected in series with all of the transistors of the motor, said switching transistor being normally in its conductive state;

means for applying a direct current voltage across said switching transistor and the plurality of stator windings;

a parallel combination circuit of a capacitor and a resistor connected between the collector and emitter electrodes of said switching transistor; and bias means responsive to rotation speeds of the rotor which exceed a predetermined speed for applying to said switching transistor a bias voltage which renders said switching transistor non-conductive whereby a reduced direct current flows to the stator windings through the transistors of the motor and said parallel combination circuit from the direct current applying means.

4. The rotation control circuit of claim 3, wherein said bias means comprises a first circuit including a first transistor which is normally in a cut off state, said first circuit rendering the first transistor into a conductive state in response to a level of a counter electromotive voltage which is generated in the stator windings in proportion to the rotation speed of the rotor, said level corresponding to the predetermined speed of the rotor, a second circuit coupled to the first circuit in cascade connection, said second circuit including a second transistor which is normally in a conductive state, said second circuit rendering the second transistor into a cut off state to the conductive state, a second parallel combination circuit of a capacitor and a resistor connected between the emitter and base electrodes of the switching transistor, and means for applying the direct current voltage across the emitter electrode of the switching transistor and the emitter electrode of the second transistor.

5. The rotation control circuit of claim 4 which further comprises resistors respectively connected to the bases of the transistors of the motor; a variable resistor connected in series with all of said resistors; and means for applying the direct current voltage across said variable resistor and the plurality of stator windings.

* * * * *